United States Patent [19]
Thiriet

[11] Patent Number: 5,615,665
[45] Date of Patent: Apr. 1, 1997

[54] MACHINE FOR CUTTING TILES, THE MACHINE INCLUDING AN ADJUSTABLE ARM FOR POSITIONING THE TILES

[75] Inventor: Abel Thiriet, Dole, France

[73] Assignee: Tomecanic, Aubergenville, France

[21] Appl. No.: 629,911

[22] Filed: Apr. 10, 1996

Related U.S. Application Data

[63] Continuation of Ser. No. 126,048, Sep. 23, 1993, abandoned.

[30] Foreign Application Priority Data

Sep. 25, 1992 [FR] France ................... 91/11489

[51] Int. Cl.$^6$ .................................................. B28D 1/24
[52] U.S. Cl. ................... 125/23.02; 125/23.01; 225/96.5
[58] Field of Search ................ 125/23.02, 23.01; 225/96.5

[56] References Cited

U.S. PATENT DOCUMENTS

| | | | |
|---|---|---|---|
| 2,568,816 | 9/1951 | Marus | 125/23.02 |
| 5,169,045 | 12/1992 | Liu | 125/23.02 |

FOREIGN PATENT DOCUMENTS

| | | |
|---|---|---|
| 1139167 | 6/1957 | France . |
| 1245662 | 10/1960 | France . |
| 1332587 | 6/1963 | France . |
| 2444547 | 7/1980 | France . |
| 0892125 | 8/1953 | Germany . |
| 2040344 | 2/1972 | Germany . |
| 9114140 | 3/1992 | Germany . |

*Primary Examiner*—Robert A. Rose
*Attorney, Agent, or Firm*—Shenier & O'Connor

[57] ABSTRACT

The invention relates to a machine for cutting tiles and comprising: a cutting member; a main abutment face of the stand suitable for coming into abutment against one of the sides of the tile; and a support mounted to slide perpendicularly to the cutting axis and supporting a first arm having a first face parallel to the cutting axis and suitable for bearing against the tile to be cut. A second arm is pivotally mounted on the first arm and includes a second bearing face for bearing against a tile to be cut, one of the two arms carrying an angular scale enabling the angle between the second face and the first face to be adjusted, and a device serves to lock relative pivoting between the two arms. The resulting tile cutting machine is versatile.

10 Claims, 5 Drawing Sheets

MACHINE FOR CUTTING TILES, THE MACHINE INCLUDING AN ADJUSTABLE ARM FOR POSITIONING THE TILES

This application is a continuation of application Ser. No. 08/126,048 filed on Sep. 23, 1993 now abandoned.

FIELD OF THE INVENTION

A machine is known for cutting tiles, in particular ceramic tiles, comprising: a stand having a flat bottom designed for supporting a tile for cutting purposes; a cutting member slidably mounted relative to said stand to slide parallel to a longitudinal axis of the stand, forming a cutting axis; a main abutment face of the stand extending perpendicularly to the cutting axis and enabling a side of said tile to be put into abutment therewith; and a support mounted to slide perpendicularly to the cutting axis and supporting a first arm having a first abutment face parallel to the cutting axis, and suitable for coming into abutment with the tile to be cut; the support and the first arm being secured to each other and forming a set square.

BACKGROUND OF THE INVENTION

The problem raised by that type of machine lies in achieving cuts at a determined angle. In particular, making cuts that are oblique relative to one of the rectilinear sides of the tile can be lengthy, as can be making cuts parallel to such a side. The reason is that known machines do not include means for adjusting the angle of cut that are both simple and effective.

OBJECTS AND SUMMARY OF THE INVENTION

According to the present invention, in order to remedy the shortcomings of known machines, such a machine further includes a second arm which is pivotally mounted on the first arm about a pivot pin perpendicular to the bottom of the stand, said second arm including a second abutment face suitable for coming into abutment with a tile to be cut, and an angular scale is secured to one of the first and second arms, enabling the angular orientation of the second abutment face relative to the first abutment face to be adjusted, and a device for locking relative pivoting of said two arms, enabling said pivoting to be locked.

Preferably, the following advantageous dispositions are also adopted:

- the angular scale is carried by the second arm;
- the angular scale extends along a circular arc centered on the pivot pin, the second abutment face coming to an end at its point of intersection with said circular arc;
- the device for locking pivoting comprises a slot formed in one of said first and second arms and a stud mounted on the other one of said arms, engaged in the slot, and associated with a mechanisms for controlling the locking of relative pivoting between said arms;
- the second abutment face is suitable for being put into a special configuration in which it is parallel to said cutting axis, said stud being itself placed in a special position in the slot, the second arm possessing an end that is disposed in said special configuration beyond the pivot axis relative to the support of the first arm, with the slot extending from said special position of the stud at least in a first direction enabling subsequent displacement of the stud along the slot corresponding to said end of the second arm being displaced away from the cutting axis so as to cause the second abutment face to take up an oblique position relative to the cutting axis and lying in the range 0° to less than 90° starting from the position in which said second abutment face is parallel to the cutting axis;
- the main abutment face of the stand is provided with a notch for receiving a corner of a tile to be cut, the notch being centered in a plane perpendicular to the bottom of the stand and containing the cutting axis;
- the stand includes two devices for locking the support, which devices are disposed on opposite sides of the cutting axis, with either of the two locking devices being suitable for locking said support;
- the stand is provided with a first scale extending parallel to the direction in which the support slides, and which is suitable for indicating the distance between the first abutment face of the arm and the cutting axis; and
- the support of the arm is itself provided with a second scale suitable for moving relative to at least one reference mark on the stand, the graduations of the second scale being identical in pitch to the graduations of the first scale, said second scale extending in the opposite direction to said first scale and having an origin value which is identical to the end value of the first scale, such that when the first abutment face is at a distance from the cutting axis greater than the end value of the first scale, it can be measured by reading the relative position of the second scale placing said reference mark.

The main advantage of machines in accordance with the invention lies in their versatility in use: the user is provided with a machine that is instantly suitable for enabling any kind of cut to be performed on a tile, whether parallel to one of its sides or oblique relative to a side, without there being any need for complex handling. The machine is thus simple and versatile in use and simultaneously it is a simple machine.

BRIEF DESCRIPTION OF THE DRAWINGS

The invention will be better understood and secondary characteristics and advantage thereof will appear from the following description of embodiments given below by way of example.

Naturally the description and the drawings are given purely by way of non-limiting indication.

Figure 1:
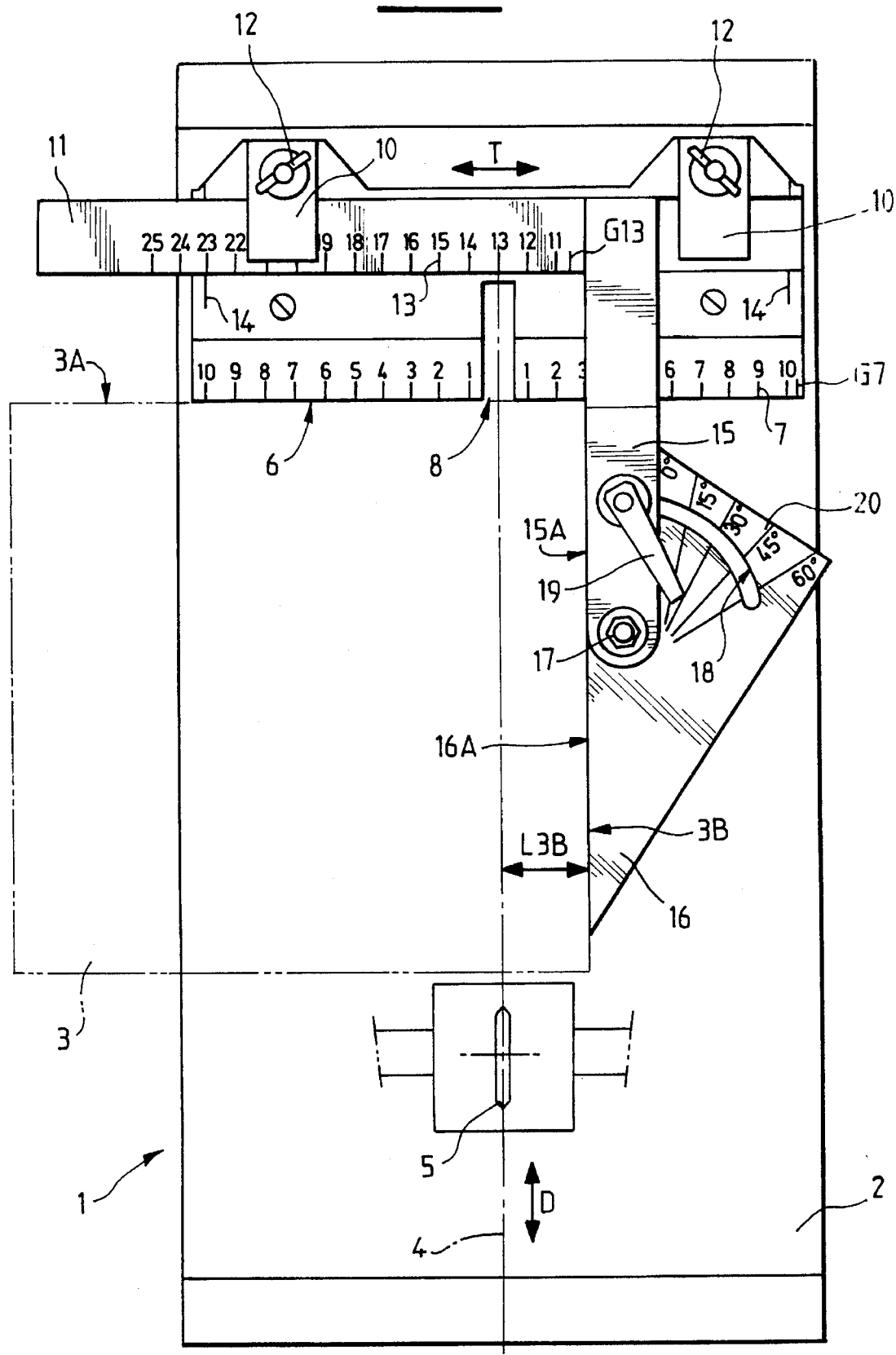
Figure 2:
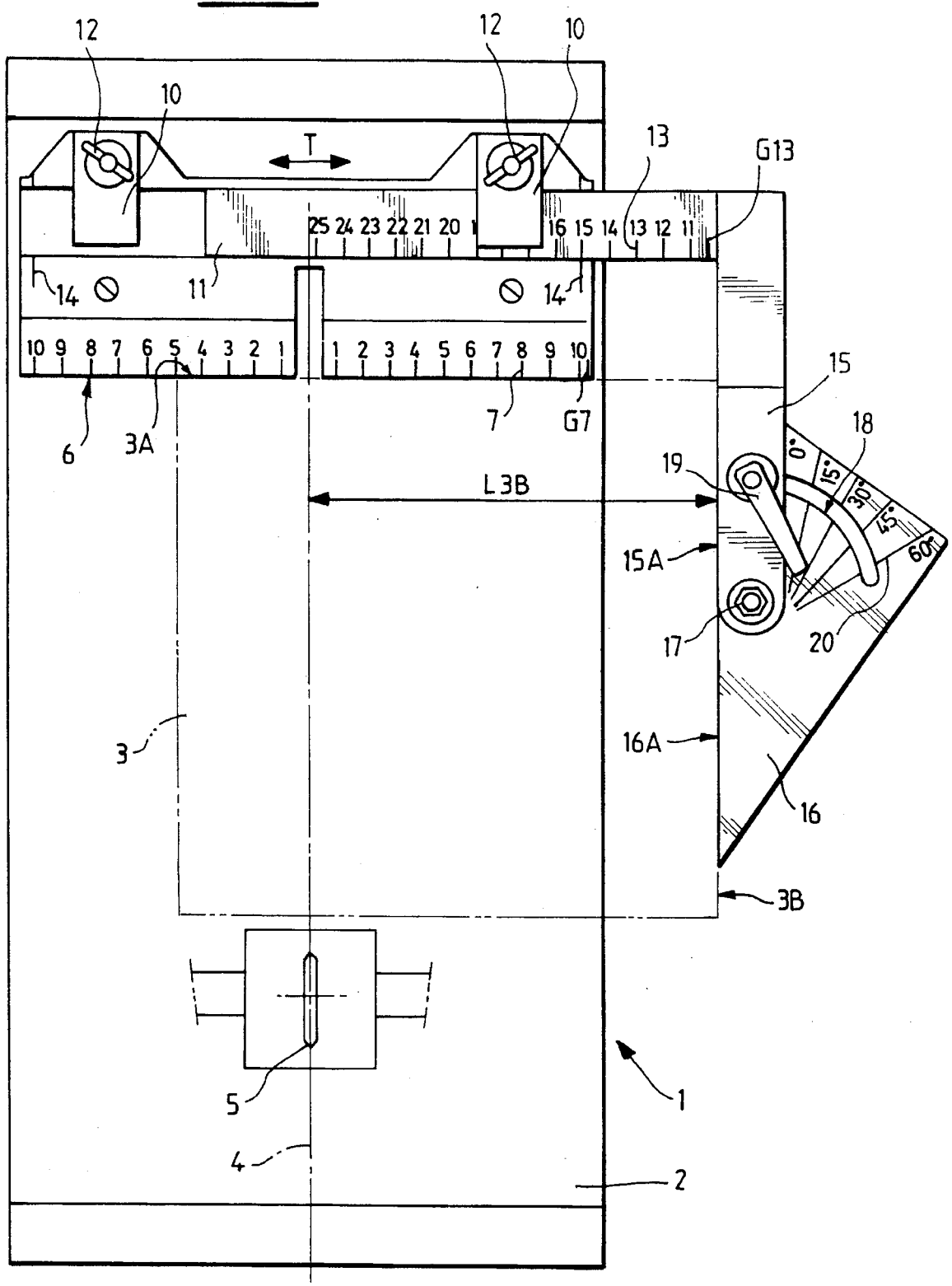
Figure 3:
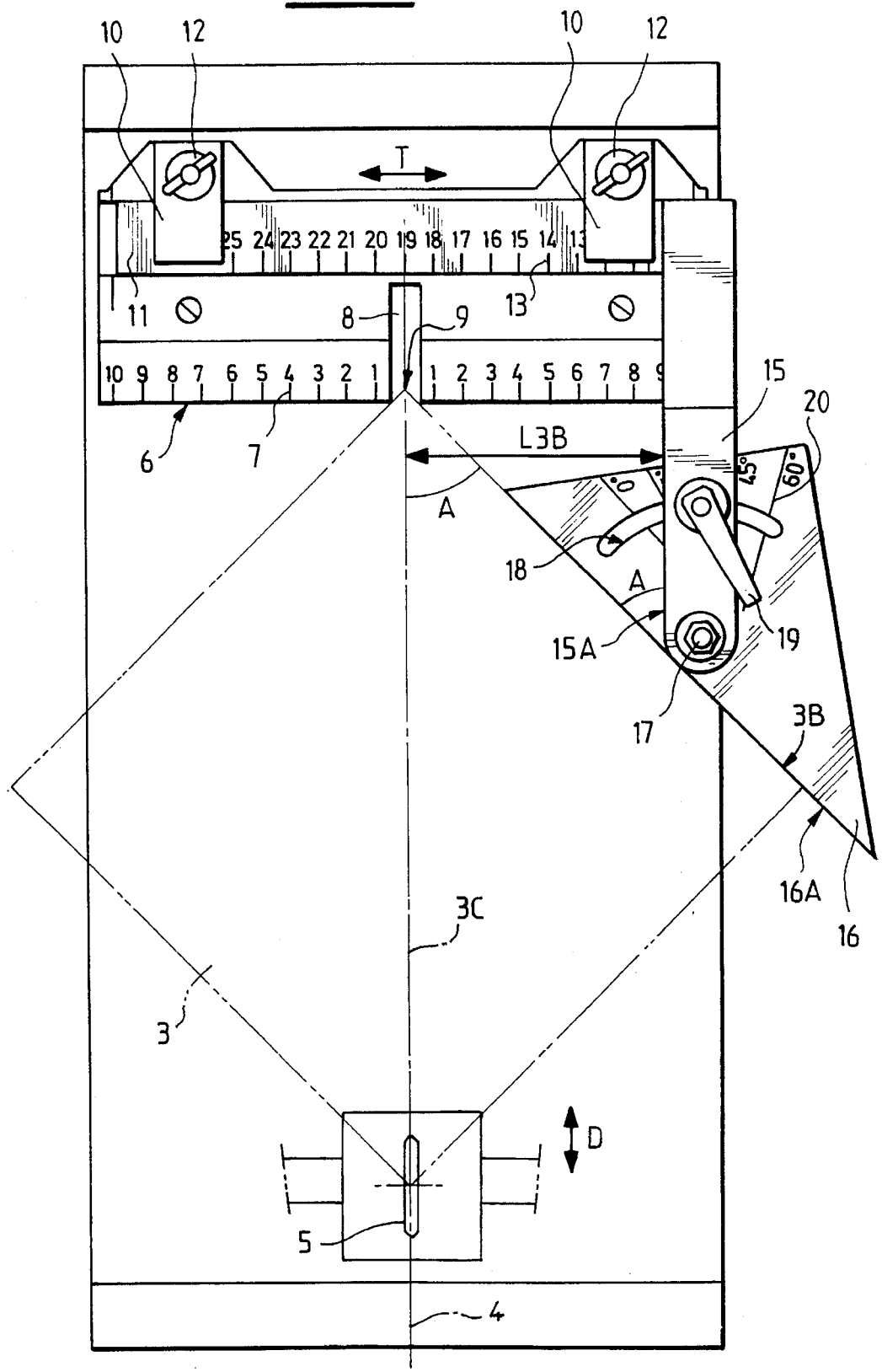
Figure 4:
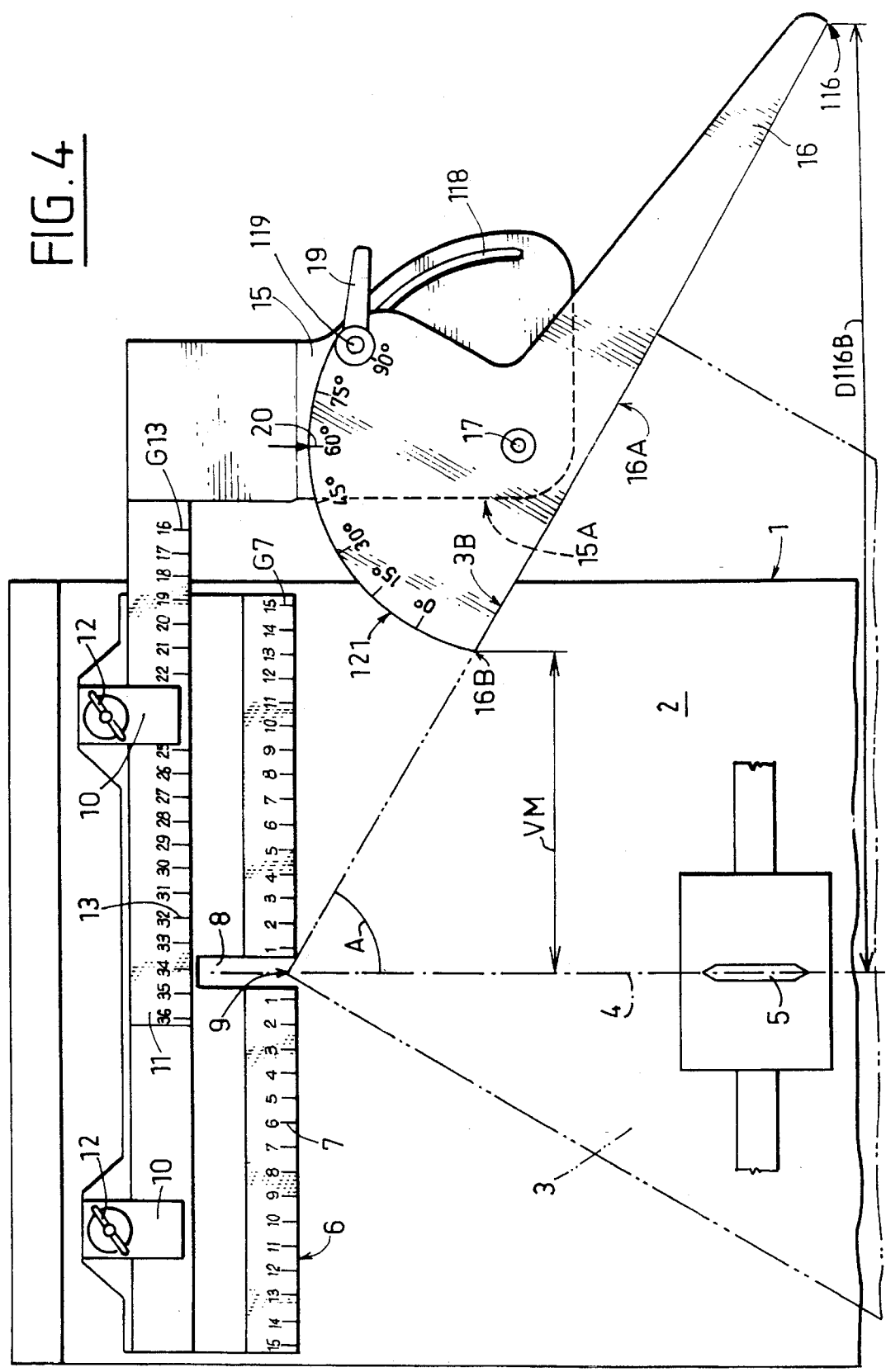
Figure 5:
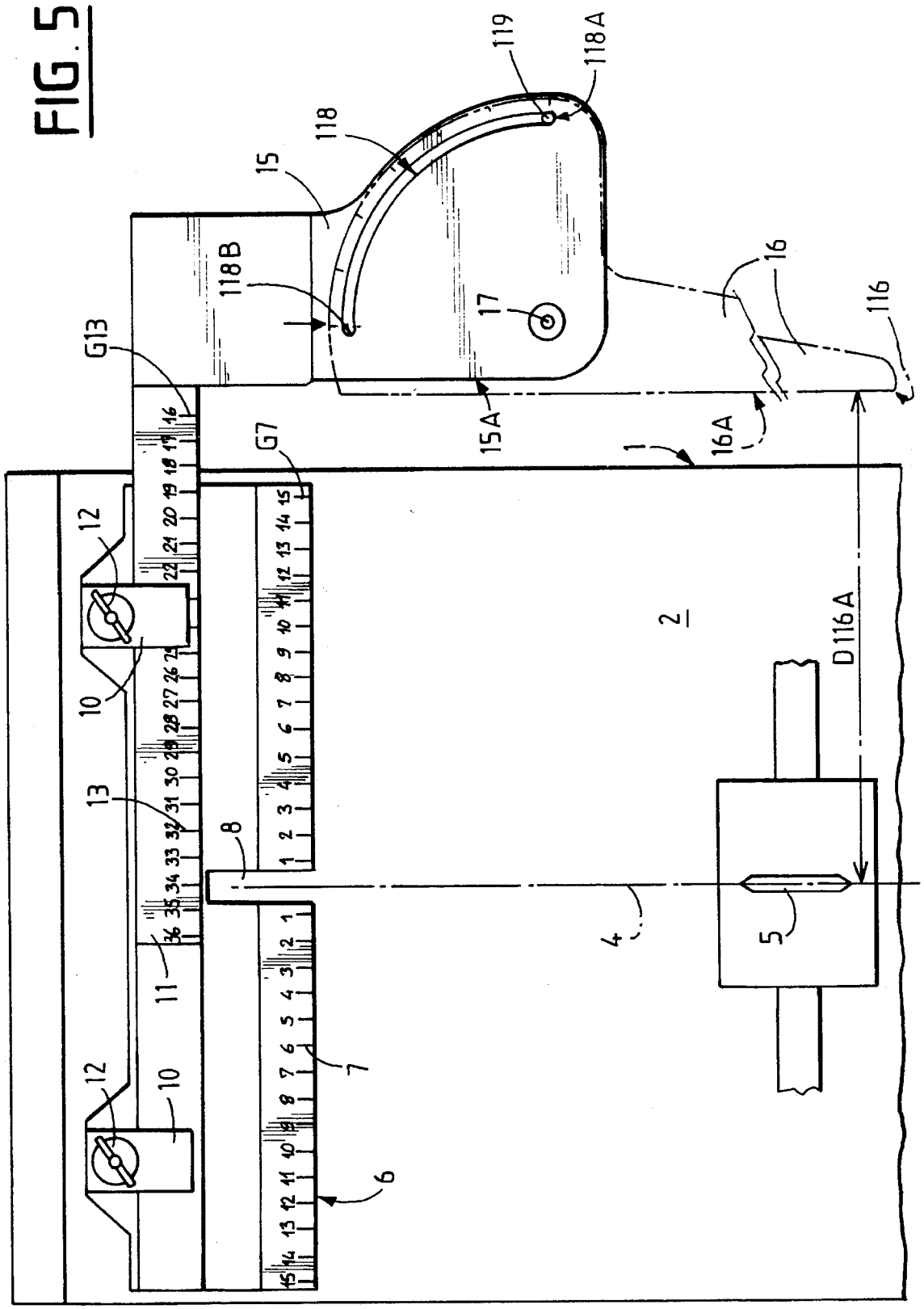

Reference is made to the accompanying drawings, in which:

FIGS. 1, 2, and 3 are plan views of the same machine of the invention shown in three distinct configurations of use;

FIG. 4 shows a variant embodiment of the invention in a configuration analogous to that of FIG. 3; and FIG. 5 shows the FIG. 4 machine in a special configuration, different from that of FIG. 4.

MORE DETAILED DESCRIPTION

The machine shown for cutting tiles made of earthenware or similar materials comprises:

a stand 1 including a plane 2 on which a tile 3 to be cut is placed;

a cutting axis 4 of said frame;

a cutting member 5 mounted to slide parallel to the direction D of the cutting axis 4 in a plane perpendicular to the plane 2 and containing the cutting axis 4;

a transverse rim 6 extending perpendicularly to the cutting axis 4 and secured to the stand 1, the rim 6 having a main abutment face 6 against which a first side 3A of the tile 3 can be brought into abutment, and is indeed placed in abutment when the machine is in the configurations shown in FIGS. 1 and 2;

a first scale 7 which in the example shown comprises two scales extending symmetrically away from the cutting axis 4, and serves in the configuration of FIG. 1 to measure the distance L3B between a second side 3B of the tile 3 and the cutting axis 4;

a notch 8 for receiving a corner 9 of the tile 3, the notch being centered on the cutting axis 4 and being formed in the rim 6;

two clips 10 for locking a support ruler 11 in place, the clips being provided with respective locking screws 12 suitable for clamping said support ruler 11 to the stand 1 thus preventing it from moving relative to the stands, the clips being disposed symmetrically about the cutting axis 4, thus enabling the support ruler 11 to be locked relative to the stand 1 either by one only of the two clips 10 (FIG. 1 and FIG. 2) or else by both clips together (FIG. 3);

when not locked in place by the clips 10, the support ruler 11 is suitable for sliding relative to the stand parallel to the transverse direction T, i.e. parallel to the plane 2 and perpendicular to the cutting axis 4, with the ruler being supported on the stand;

a second scale 13 is supported by the support ruler 11, is made using the same measurement units as the first scale 7, and is associated with the righthand portion (FIGS. 1, 2, and 3) of the first scale 7, extending in the opposite direction to said portion of the first scale (the righthand portion of the first scale increases going from left to right, whereas the second scale 13 increases going from right to left);

two reference marks 14 are engraved or painted on the stand 1 symmetrically about the cutting axis 14 and facing the second scale 13;

since the starting value G13 of the second scale 13 is equal to the end value G7 of the righthand portion of the first scale 7, when G7 is placed facing the reference mark 14, then G7 and G14 are situated on a common straight line parallel to the cutting axis 4; in this position (FIG. 3) the distance L3B can be read on the first scale; in contrast, when the distance between the side 3B of the tile 3 and the cutting axis 4 becomes greater than G7, the first scale is no longer capable of measuring said distance, but L3B can nevertheless be read from the second scale which can be used for measuring from G13, i.e. it can also be used from the end G7 of the righthand portion of the first scale 7;

a first arm 15 is fixed to the righthand end of the support ruler 11 and forms a 90° set square therewith, having a first abutment face 15A against which the side 3B of the tile can be brought into abutment; when the distance L3B is less than G7 it can be read (FIGS. 1 and 3) from the intersection between the righthand portion of the first scale and the first abutment face 15A; the first abutment face 15A is also parallel to the cutting axis 4;

a second arm 16 having a second abutment face 16A perpendicular to the plane 2 and contained in the same plane as the first abutment face 15A in the configurations of FIGS. 1 and 2 is pivotally mounted relative to the first arm 15 by means of a pivot pin 17;

the second arm 16 is mounted beneath the first arm 15 and includes a slot 18 in the form of a circular arc centered on the pivot pin 17, a guide finger being inserted in said slot and enabling pivoting of the second arm relative to the first arm to be selectively locked under the control of a control lever 19 and a conventional ratchet device; and finally said second arm carries an angular scale 20 enabling the orientation of the second arm 16 relative to the first arm 15 to be adjusted by selecting the angle A between the first and second abutment faces 15A and 16A; when these abutment faces are contained in the same plane (FIGS. 1 and 2) the angle A is equal to zero, as shown by the scale 20.

It should be observed that such angle measurements are rarely accurate, and that when aligning the cutting axis 4 with the diagonal of a square tile 3 that has one corner 9 received in the notch 8, it is preferable to adjust the position of the tile accurately, e.g. by visual inspection, or by any other accurate mechanical means that is compatible with implementation of the present invention.

With the machine as described, the user can:

cut a rectangular strip of width L3B less than G7 (FIG. 1) from a tile by locking the support ruler 11 using the lefthand clip 10, by putting the side 3B of the tile 3 against the first abutment face 15A of the first arm 15 which is permanently accurately parallel to the cutting axis 4, and by measuring L3B using the righthand portion of the first scale 7;

cut a rectangular strip of width L3B greater than G7 (FIG. 2) from the tile by locking the support ruler 11 using the righthand clip 10, by bringing the side 3B of the tile 3 into abutment against the first abutment face 15A of the first arm 15, and by measuring L3B by using the second scale 13 (the value L3B being the value of the scale mark facing the righthand reference mark 14);

perform any cut 3C at an angle A relative to the side 3B of the tile, regardless of whether such an oblique cut coincides with a diagonal of the tile (FIG. 3) or whether the corner 9 of the tile 3 bears against the main abutment face 6 instead of being received in the notch 8, with the side 3B being brought into abutment against the second abutment face 16A, as shown in FIG. 3; and cut tiles of all sizes, in particular because of the freedom of the support ruler 11 to slide parallel to the direction T and because of the possibility of locking it in place by means of one or the other or both of the clips 10.

In a variant, the angular scale 20 may be carried by the first arm 15, in which case a reference mark that is fixed relative to the second arm 16 serves to adjust the angle A.

FIG. 4 shows another variant embodiment in which the slot for guiding pivoting of the second arm 16 relative to the first arm 15 is formed in the first arm 15 and is designated by reference 118. This slot is in the form of a circular arc centered on the pivot pin 17 and is associated with the control lever 19 for selectively locking pivoting. A stud 119 associated with the control lever 19 is inserted in the slot 118. The angular scale 20 supported by the second arm 16 extends over a circular arc 121 likewise centered on the pivot pin 17. The second arm 16 is also defined at 16B along its second abutment face 16A by the point of intersection between the circular arc 121 and the second abutment face 16A, thereby reducing the size of the second arm and also making it possible to obtain a maximum amount of clearance VM for passing the support of the cutting member 5. More generally, the scale 20 extends along a convex curve whose point of intersection 16B with the second abutment face 16A is closer to the pin 16 than is the corresponding point of intersection of the straight support for the angular scale as shown in FIG. 3, thus making it possible to reduce the size of the support of the angular scale after pivoting through an angle analogous to that shown in FIG. 4, thus making it possible to obtain maximum clearance VM for passing the support of the cutting member 5. It should also be observed that in this embodiment, the second arm 16 is placed above the first arm 15.

FIG. 5 shows a particular configuration of the FIG. 4 tile cutting machine. This figure shows the first arm 15 in continuous lines with the second arm 16 being superposed thereon in chain-dotted lines. The control lever for selectively locking pivoting is omitted for reasons of clarity, but the corresponding stud 119 is shown inside the slot 118. In the particular configuration shown, the stud 119 is placed at one end 118A of the slot 118 and it is capable of travelling all the way along the slot to its other end 118B, thereby making it possible to place a tile to be cut as shown in FIG. 4 such that the angle A lies in the range at least 0° to less than 90° of arc. There exists an intermediate position of the second arm 16, as shown in FIG. 4, and thus when the stud 119 is positioned in the slot 118 somewhere between the ends 118A and 118B of the slot 118, which corresponds to an intermediate position of the end 116 of the second arm 16 which, in the particular configuration of FIG. 5, is situated beyond the axis 17 relative to the support ruler 11 and is offset by a distance D116A from the cutting axis 4 when the second abutment face 16A is parallel to the cutting axis 4, said intermediate position of the end 116 being itself offset from the cutting axis 4 by a distance D116B that is greater than the distance D116A. As shown in FIG. 4, this makes it possible to clear the plane 2 of the support 1 for the purpose of placing a tile 3 to be cut. This disposition is advantageous and is clearly linked to the relative positions chosen for the slot 118 and the stud 119 that is inserted therein.

Nevertheless, this disposition is not tied to the design choice of forming the slot 118 in the first arm 15; in a variant it would be easy to provide a slot in the second arm 16 suitable for receiving a stud mounted on the first arm 15 in such a manner as to obtain the same disposition. Starting from a configuration analogous to that of FIG. 5, it would suffice merely for the slot then formed in the second arm 16 to extend in the opposite direction to the slot 118 of FIG. 5, with the stud then being disposed close to the location of the end of the slot marked 118B in FIG. 5.

Similarly, in a variant of the embodiment of FIGS. 4 and 5, it would be easy to place the scale 20 on the first arm 15 instead of on the second arm 16.

The invention is not limited to the embodiments shown, but on the contrary covers any variant that could be applied thereto without going beyond the ambit or the spirit thereof.

I claim:

1. A machine for cutting tiles including in combination means providing a generally horizontal flat surface for supporting a tile, said surface having orthogonally disposed longitudinal and lateral axes, cutting means disposed to move along the longitudinal axis, means providing a laterally extending face of small vertical extent, said laterally extending face being abutted by the tile, a laterally slidable member mounted on the supporting means, the member comprising a generally longitudinally extending first arm having a vertically disposed pivot axis which is appreciably displaced longitudinally from said lateral face, and a second arm mounted on the first arm for rotation parallel to said surface about the pivot axis, the second arm having a straight face of small vertical extent which is abutted by the tile, the straight face having an appreciable horizontal extent in each direction from a normal to the straight face which intersects the pivot axis, the tile abutting the straight face at points appreciably spaced horizontally from said normal in each direction.

2. A machine as in claim 1 further including an angular scale carried by one of the first and second arms.

3. A machine as in claim 1 further including means for locking the first and second arms relative to one another such that the straight face makes a predetermined angle with the lateral face.

4. A machine as in claim 3 wherein the locking means comprises a slot formed in one of the first and second arms and a stud mounted on the other of said arms.

5. A machine as in claim 1 wherein the lateral face is provided with a notch, said notch receive a corner of the tile, the notch being aligned with the cutting means along the longitudinal axis.

6. A machine as in claim 1 further including first and second means disposed on either side of the longitudinal axis and individually actuable to lock the laterally slideable member in a predetermined position.

7. A machine as in claim 1 further including means comprising a laterally extending scale mounting on the supporting means for indicating smaller distances of the pivot axis from the longitudinal axis, wherein the laterally slideable member is provided with means comprising a laterally extending scale for indicating larger distances of the pivot axis from the longitudinal axis.

8. A machine as in claim 1 wherein the first arm has a straight and longitudinally extending face of small vertical extent adapted to be abutted by the tile.

9. A machine as in claim 8 wherein the second arm is rotatable to a position where its straight face extends longitudinally, the construction of the first and second arms being such that their straight faces lie superposed in the same longitudinally extending vertical plane.

10. A machine as in claim 8 wherein the second arm is rotatable to a position where the straight face of the first arm cannot abut the tile.

* * * * *

UNITED STATES PATENT AND TRADEMARK OFFICE
CERTIFICATE OF CORRECTION

PATENT NO. : 5,615,665
DATED : April 1, 1997
INVENTOR(S) : Abel Thiriet

It is certified that error appears in the above-indentified patent and that said Letters Patent is hereby corrected as shown below:

Claim 1, line 1 - delete "tiles", insert -- a tile --.
Claim 1, line 3 - change "a" to -- the --.

Claim 5, line 2 - "receive" should read -- receiving --.

Claim 7, line 2 - "mounting" should read -- mounted --.

Signed and Sealed this

Seventeenth Day of June, 1997

Attest:

BRUCE LEHMAN

Attesting Officer

Commissioner of Patents and Trademarks